Patented May 20, 1952

2,597,372

UNITED STATES PATENT OFFICE 2,597,372

PRODUCTION OF ALKYLCYCLOPENTANE HYDROCARBONS AND BENZENOID HYDROCARBONS

Herman Pines and Vladimir N. Ipatieff, Chicago, Ill., assignors to Universal Oil Products Company, Chicago, Ill., a corporation of Delaware No Drawing. Application December 30, 1947, Serial No. 794,772

8 Claims. (Cl. 260—666)

This invention relates to a process for producing alkylcyclopentane hydrocarbons and benzenoid hydrocarbons.

An object of this invention is to produce alkylcyclopentane hydrocarbons and benzenoid hydrocarbons from a mixture of cyclohexane hydrocarbons and bicycloalkane hydrocarbons containing a ring of 5-carbon atoms and another ring of 6-carbon atoms.

One specific embodiment of this invention relates to a process for producing alkylcyclopentane hydrocarbons and benzenoid hydrocarbons which comprises reacting a cyclohexane hydrocarbon and a bicycloalkane hydrocarbon having a ring of 5-carbon atoms and another ring of 6-carbon atoms at dehydrogenation conditions in the presence of a dehydrogenation catalyst.

Another embodiment of this invention relates to a process for producing alkylcyclopentane hydrocarbons and para-cymene which comprises reacting para-menthane and isocamphane at dehydrogenation conditions in the presence of a platinum catalyst.

Camphane, isocamphane, isobornylane, and fenchane are examples of suitable bicycloalkane charging stocks each of which contains a ring of 5-carbon atoms and a second ring of 6-carbon atoms.

The cyclohexane hydrocarbons utilizable in this process comprise cyclohexane, methylcyclohexane, dimethylcyclohexane, other monoalkylcyclohexanes having an alkyl group such as ethyl, propyl, isopropyl, and the like, para-menthane, para-ethylisopropylcyclohexane, para-diisopropylcyclohexane and more highly alkylated cyclohexane hydrocarbons which may be dehydrogenated to benzenoid hydrocarbons.

We have found that mixtures of cyclohexane hydrocarbons and certain bicycloalkane hydrocarbons having a ring of 5-carbon atoms and a second ring of 6-carbon atoms undergo hydrogen transfer reaction in the presence of a dehydrogenation catalyst to form alkylcyclopentane hydrocarbons and benzenoid hydrocarbons, both of these classes of hydrocarbons being valuable constituents of gasoline. The alkylcyclopentane hydrocarbons and benzenoid hydrocarbons formed in the process are also valuable intermediates for the synthesis of other organic compounds utilizable as insecticides, medicinals, etc.

Thus the reaction between para-menthane and isocamphane to form methylbutylcyclopentane and para-cymene in the presence of a dehydrogenation catalyst such as platinum-alumina is illustrated by the following equation:

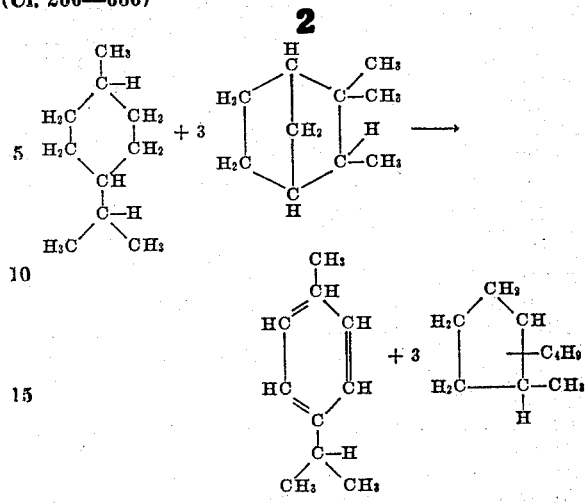

The process is carried out in the presence of dehydrogenation catalyst either in the form of one or more fixed beds or layers of solid catalyst in a suitable reactor or as powdered catalyst utilizable in so-called fluidized operation in which the vapors of the reacting hydrocarbons are mixed with finely divided catalyst and contacted in a suitable reactor after which the hydrocarbons and catalysts are separated and the used catalyst is returned to further use in the process. Such dehydrogenation catalysts comprise metals selected from the members of group VI and group VIII of the periodic table and include particularly cobalt, nickel, palladium, and platinum. It is generally preferred to employ dehydrogenation catalyst in which the metal or its oxide is supported by or composited with a suitable carrier such as alumina, silica, and the like. Platinum-alumina, chromium-sesquioxide-alumina and nickel-silica are highly effective catalysts for this process.

This process is carried out by contacting the cyclohexane hydrocarbons and bicycloalkane hydrocarbons with one or more of the mentioned dehydrogenation catalysts in either batch or continuous types of operation. In batch type operation, the reacting hydrocarbons and catalysts are placed in a suitable autoclave and heated at a temperature of from about 200° to about 450° C. for a time sufficient to effect the hydrogen transfer reaction and produce a reaction mixture containing substantial proportions of alkylcyclopentane hydrocarbons and benzenoid hydrocarbons.

The process may be carried out continuously by passing the reacting hydrocarbons through a tubular reactor containing one or more layers or sections of granular dehydrogenation catalyst maintained at a temperature of from about 200° to about 450° C. and at a pressure of from atmospheric to about 40 atmospheres. It is generally preferred to carry out the process at about atmospheric pressure. The operating temperature to be used in either batch or continuous operation is also dependent upon the activity of the catalyst. With the more active catalysts such as various composites of platinum and alumina, a temperature of from about 250° to about 350° C. is preferred for producing alkylcyclopentane hydrocarbons in high yields as some decomposition of the desired alkylcyclopentane hydrocarbons occurs in the presence of this catalyst at temperatures of from about 350° to about 450° C., while in the presence of a composite of chromium sesquioxide and alumina, the preferred catalyst temperature is from about 350° to about 450° C. as the process proceeds at a higher rate than at temperatures of from about 200° to about 350° C.

This process for producing alkylcyclopentane hydrocarbons is illustrated by the following example:

A solution consisting of an equimolal proportion of p-menthane and isocamphane was passed at 270° over a platinized alumina catalyst containing 8% of platinum at a liquid hourly space velocity of 0.5.

The product of the reaction consisted of p-cymene and of alkylcyclopentanes. The aromatic hydrocarbons were removed by means of treatment with sulfuric acid containing 15% of sulfur trioxide. The saturated hydrocarbons were passed again over the same catalyst until no more dehydrogenation occurred and the aromatic hydrocarbons were removed as indicated above. The saturated hydrocarbons remaining from such a treatment consisted of alkylcyclopentanes containing substantial amounts of methylbutylcyclopentane.

We claim as our invention:

1. A process for producing alkylcyclopentane hydrocarbons and benzenoid hydrocarbons which comprises reacting a cyclohexane hydrocarbon and a bicycloalkane hydrocarbon having a ring of 5-carbon atoms and another ring of 6-carbon atoms at a temperature of from about 200° C. to about 450° C. in the presence of a dehydrogenation catalyst and at a pressure of from about atmospheric to about 40 atmospheres.

2. A process for producing alkylcyclopentane hydrocarbons and benzenoid hydrocarbons which comprises reacting a cyclohexane hydrocarbon and a bicycloalkane hydrocarbon having a ring of 5-carbon atoms and another ring of 6-carbon atoms at a temperature of from about 250° to about 350° C. in the presence of a platinum catalyst and at a pressure of from about atmospheric to about 40 atmospheres.

3. A process for producing alkylcyclopentane hydrocarbons and benzenoid hydrocarbons which comprises reacting para-menthane and isocamphane in the presence of a platinum catalyst at a temperature of from about 250° to about 350° C.

4. A process for producing alkylcyclopentane hydrocarbons and benzenoid hydrocarbons which comprises reacting a cyclohexane hydrocarbon and a bicycloalkane hydrocarbon having a ring of 5-carbon atoms and another ring of 6-carbon atoms at a temperature of from about 350° to about 450° C. in the presence of a chromium sesquioxide-alumina catalyst.

5. A process for producing alkylcyclopentane hydrocarbons and para-cymene which comprises reacting para-menthane and isocamphane at a temperature of from about 350° to about 450° C. in the presence of a chromium sesquioxide-alumina catalyst.

6. A process for producing alkylcyclopentane hydrocarbons and benzenoid hydrocarbons which comprises reacting a cyclohexane hydrocarbon and a bicycloalkane hydrocarbon selected from the group consisting of camphane, isocamphane, isobornylane and fenchane at a temperature of from about 200° C. to about 450° C. in the presence of a dehydrogenation catalyst and at a pressure of from about atmospheric to about 40 atmospheres.

7. A process for producing alkylcyclopentane hydrocarbons and benzenoid hydrocarbons which comprises reacting a cyclohexane hydrocarbon and a bicycloalkane hydrocarbon selected from the group consisting of camphane, isocamphane, isobornylane and fenchane at a temperature of from about 250° to about 350° C. in the presence of a platinum catalyst and at a pressure of from about atmospheric to about 40 atmospheres.

8. A process for producing alkylcyclopentane hydrocarbons and benzenoid hydrocarbons which comprises reacting para-menthane and isocamphane in the presence of a dehydrogenation catalyst at a temperature of from about 200° C. to about 450° C. and a pressure of from about atmospheric to about 40 atmospheres.

HERMAN PINES.
VLADIMIR N. IPATIEFF.

REFERENCES CITED

The following references are of record in the file of this patent:

UNITED STATES PATENTS

| Number | Name | Date |
| --- | --- | --- |
| 2,400,012 | Littman | May 7, 1946 |
| 2,502,569 | Ipatieff et al. | Apr. 4, 1950 |

OTHER REFERENCES

Adkins et al., Jour. Am. Chem. Soc., vol. 63, 1320-5 (1941).

Zelinsky et al., Annalen, vol. 476, 60 (1929).